June 2, 1970      A. R. TUCKER      3,514,871

WIDE ANGLE VISUAL DISPLAY

Filed May 9, 1967

INVENTOR.
ARTHUR R. TUCKER

Amster & Rothstein
ATTORNEYS

United States Patent Office 3,514,871
Patented June 2, 1970

3,514,871
WIDE ANGLE VISUAL DISPLAY
Arthur R. Tucker, Hillsdale, N.J., assignor to Dalto Electronics Corporation, Norwood, N.J., a corporation of Delaware
Filed May 9, 1967, Ser. No. 637,108
Int. Cl. G09b 9/08
U.S. Cl. 35—12      2 Claims

ABSTRACT OF THE DISCLOSURE

A visual display for a flight simulator viewed throughout a comparatively wide angle and consisting of several pictorial displays and virtual image lenses positioned between the viewer and the pictorial displays to, firstly, give the viewer the apparent impression that the pictorial displays are at a considerably distance removed from the simulator and, secondly, to accommodate to the viewer's binocular vision as a result of which the spaced-apart marginal adjacent edges of the pictorial displays are seen as a single, fused or registered visual impression.

---

The present invention relates generally to flight simulators, and more particularly to improvements in the visual display of a flight simulator.

There are several reasons why it is desirable that there be a comparatively wide viewing angle of the visual display of a flight simulator. One important reason is that the pilot of an actual aircraft usually has a wide, unobstructed view of the terrain he is flying over and, thus, only by duplicating this viewing angle can a flight simulator, which is judged by how effectively it simulates actual flying experiences, be an effective and useful training device. For this reason in most prior art visual displays for flight simulators use is made of a single large curved screen on which there is projected an appropriate "wide angle" pictorial display or image. This system, however, requires the use of optical devices to correct for spherical aberration and other such phenomena which result from using a cruved screen. Further, this system is not entirely satisfactory in the degree of clarity and the amount of detail which is presented by the single pictorial display. It is thus considered much more advantageous to have a visual display made up of several planar displays circumferentially spaced about the simulated aircraft since with such a system the individual pictorial displays have greater clarity and detail and thus present an improved composite display and only minimal optical correction, if any is required for the planar displays. However, the use of plural planar images or pictorial displays has the serious drawback of requiring accurate registration of the adjacently located images so that a discontinuity in the composite display is not manifested to the viewer to possibly destroy the realism of the display. The inability to solve this problem undoubtedly accounts for the lack of use of any but curved screen visual displays for flight simulators requiring a wide viewing angle.

Broadly, it is an object of the present invention to provide an improved "wide angle" visual display overcoming the foregoing and other shortcomings of the prior art. Specifically, it is an object to provide a visual display which, in a preferred embodiment, uses three pictorial displays and, without any exacting and accurate registration between these displays, presents a remarkably realistically composite visual display.

In the above noted preferred embodiment of a visual display according to the present invention there is operatively associated with the three pictorial displays a group of three virtual image lenses, preferably supported on the simulated aircraft of the flight simulator in a forward position. The pictorial displays are thus viewed through these lenses and are modified accordingly in at least two respects. First, the lenses function in a well understood manner to give the viewer the impression that the displays are considerably removed from simulated aircraft. Second, each lens cooperates with the lens next to it to function much in the same way as a pair of binoculars. The practical result of this is that whatever may be the separate visual impressions as seen by each of the two eyes of the viewer, these visual impressions are fused in the viewer's brain into a single, clear visual impression. Thus, with no more care than merely duplicating the content of the pictorial displays along adjacent marginal edges and generally aligning the same, the viewer experiences a single, clear visual impression if the content projected along these marginal edges.

The above brief description, as well as further objects, features and advantages of the present invention, will be more fully appreciated by reference to the following detailed description of a presently preferred but, nonetheless, illustrative embodiment in accordance with the present invention, when taken in conjunction with the accompanying drawings wherein.

Figure 1:
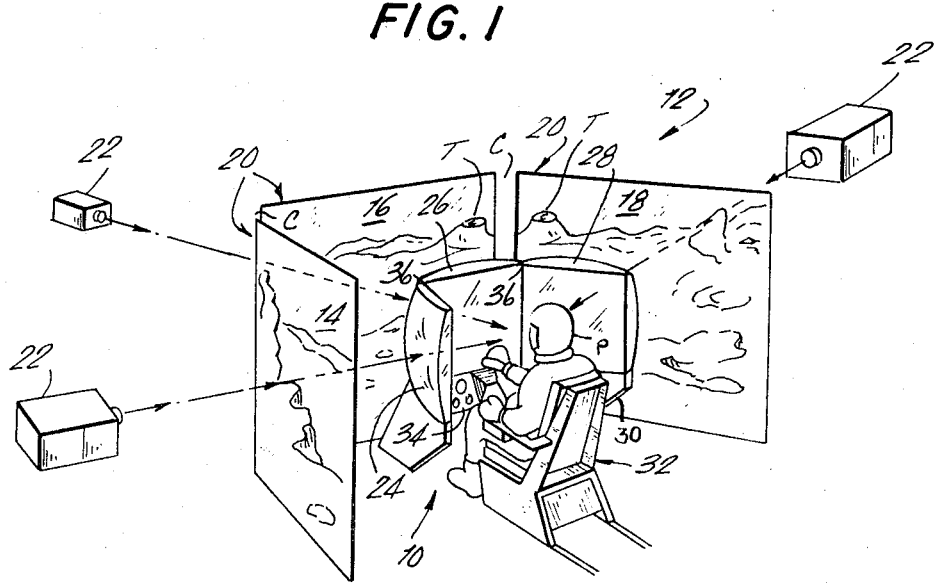
FIG. 1 is a perspective view illustrating the essential aspects of a wide angle visual display for a flight simulator according to the present invention.
Figure 2:
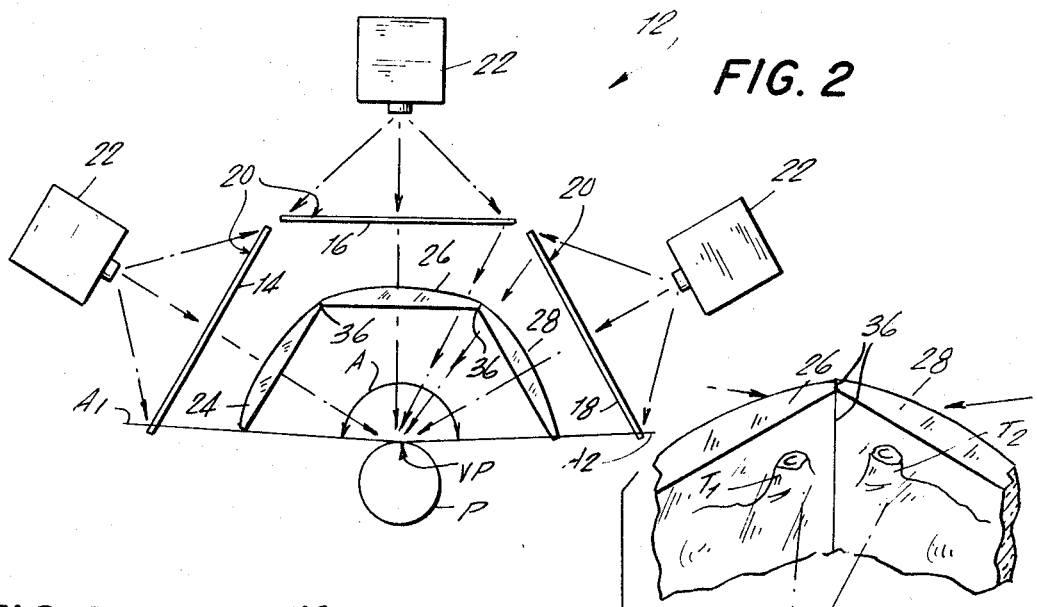
FIG. 2 is a plan view of the visual display illustrating further details thereof.

Reference is now made to the drawings and in particular to FIG. 1 wherein there is shown a flight simulator, generally designated 10, having a visual display, generally designated 12, demonstrating objects and advantages of the present invention. The display 12 affords what can be characterized as a comparatively wide viewing angle A of the three pictorial displays 14, 16 and 18 which form an essential part of the display. A better appreciation of the azimuthal extent of this wide viewing angle A can be better had by considering the plan view of FIG. 2 in which this viewing angle A, as measured from the reference line $A^1$ delineating the end limit of the left pictorial display 14 to the reference line $A^2$ delineating the end limit of the right pictorial display 18 is approximately 180 degrees. The common origin of the reference line $A^1$, $A^2$ is the vantage point VP of the flight simulator 10, from which point it is contemplated that a pilot P or other person using the flight simulator 10 for training purposes will be situated and will view the pictorial displays 14, 16 and 18.

Figure 3:
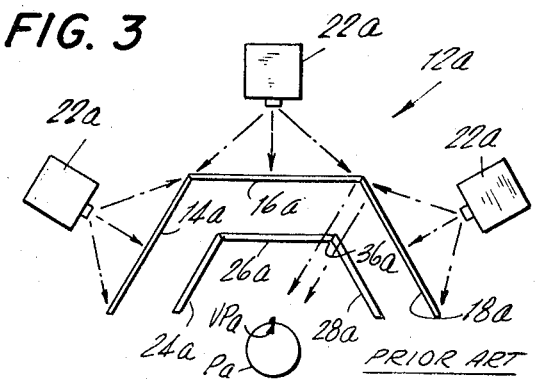
FIG. 3 is a plan view similar to FIG. 2, but of a prior art visual display which illustrates, by comparison with FIGS. 1, 2 the advances over the prior art represented by the visual display hereof.

The ability to provide a visual display 12 which can be viewed through such a comparatively wide viewing angle A without any loss of realism to the trainee P is of considerable importance in the use of the flight simulator 10. The functioning of the visual display 12 which provides this capability can be readily understood from the description of the visual display 12 which follows. This understanding, it is believed, is also enhanced by considering an exemplary prior art visual display which is illustrated in FIG. 3, in which like parts are designated by the same reference numeral followed by the suffix "a." More particularly, the novel visual display 12 hereof includes, in the preferred embodiment which is illustrated, three planar screens 20 of identical construction which are circumferentially arranged about the vantage point VP at a predetermined distance outside of and spaced from the actual simulated aircraft of the flight simulator 10. Located behind each screen 20 is a projector 22 of conventional design which operates in a well understood manner to project an image onto the screen which provides the previously noted pictorial displays 14, 16 and 18. Each projector 22 may, for example, be a television projector and project either a color or black and white image which is a function of the electronic signal fed into the projector. Alternatively, each projector 22 may be of the type which uses film transparencies to provide a projected image onto the viewing screen 20. In either of these two or other cases, the pictorial displays 14, 16 and 18 which are presented are to be representations of actual terrain with which it is desirable to familiarize the trainee P. In the usual case, for example, the displays 14, 16 and 18 would be of the terrain which the trainee P would encounter during an actual landing approach onto a particular airfield.

The particular type of projector 22 which is used in projecting the pictorial displays 14, 16 and 18 onto the screens 20 will be understood to impose no limitations on the scope of the present invention. Likewise, the subject or content of the displays 14, 16 and 18 impose no limitations. It is necessary, however, to note two characteristic aspects of the pictorial displays 14, 16 and 18. One characteristic aspect is that the three pictorial displays 14, 16 and 18 as presented on the three screens 20 are not continuous and, in fact, there may be a clearance space C left between the marginal edges of the center pictorial display 16 and the adjacent marginal edges of the pictorial displays 14 and 18. That is, it is not essential that such a clearance space C be left, but rather that the existence of such clearance space does not adversely affect the illusion of the visual display 12. The significance of this will become more apparent as the description proceeds.

The second characteristic aspect of the pictorial displays 14, 16 and 18 is that there is a substantial duplication of the projected image of the marginal portions of these displays which bound both of the clearance spaces C. This is illustrated in FIG. 1 by the terrain feature T which is reproduced both along the marginal edge of the center pictorial representation 16 and also along the adjacent marginal edge of the right pictorial display 18.

Completing the visual display 12 are three virtual image lenses 24, 26 and 28 which, preferably, are mitered and bonded together at their adjacent edges, as at 36. This bonded arrangement of lenses 24, 26 and 28 is mounted in any appropriate manner on supporting wall structure 30 which may be forward of or, as illustrated herein, form an actual part of the body of the simulated aircraft of the flight simulator 10. In this respect, the wall structure 30 is intended to be only a part of other structure which would form, for example, the nose of an aircraft which would fully enclose the trainee P seated in a chair 32 in front of a control panel 34 supported on the interior of the wall structure 30. This other wall structure which co-operates with the wall structure 30 to define the simulated aircraft has been omitted in order not to obscure the present invention and in order to more advantageously graphically illustrate the visual impression which is provided the trainee P by the visual display 12 hereof.

Figure 4:
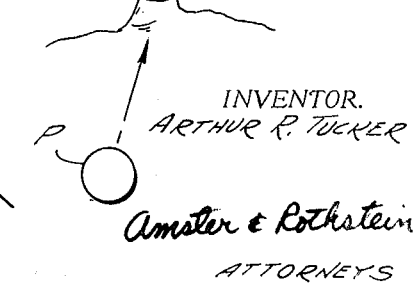
FIG. 4 is a fragmentary diagrammatic view illustrating the effect of binocular vision which is characteristic of the visual display of the present invention.

Turning now to the functioning of the just described visual display 12 which maintains a noteworthy degree of realism despite the comparatively wide viewing angle A, it is necessary to first note the visual impressions which are provided the trainee P by the virtual image lenses 24, 26 and 28. The interposed operative position of these lenses between the trainee and each of the pictorial displays 14, 16 and 18 results in the trainee, of necessity, seeing each of the pictorial displays 14, 16 and 18 as these displays are optically modified by the virtual image lenses. More particularly, these optical devices function in a well understood manner to give the trainee P the impression that what he is seeing is at an apparently greater distance from the simulated aircraft 30 than the actual distance of some five or more feet which the screens 20 are spaced from the simulated aircraft 30. In other words, depending upon the optical characteristics of the lenses 24, 26 and 28, the pictorial displays 14, 16 and 18 may appear to the trainee P to be located at any set distance of several hundred feet or more from the simulated aircraft 30. Additionally, and most important to the present invention, it has been found that the lenses 24, 26 and 28, at their respective juncture 36 function optically essentially like a pair of binoculars and that this functioning maintains a degree of realism in the projected pictorial displays which heretofore could not be achieved by prior art visual displays. The result produced by the adjacently located lenses at each of the junctures 36 is that the separate pictures seen by each of the two eyes of the viewer are fused into a single impression in his brain and produce a single, continuous picture. This is diagrammatically illustrated in FIG. 4 wherein the individual visual impressions which are transmitted simultaneously to the brain by the eyes of the viewer are each designated $T^1$ and $T^2$ respectively, and the single resulting visual impression of a single picture which is produced by these impressions and which is experienced by the trainee P is designated $T^3$.

The significance of the just described binocular vision which is advantageously made use of in the visual display 12 hereof can best be appreciated by referring now to the prior art visual display of FIG. 3. In this prior art set-up in order to preserve the realism of the pictorial displays 14a, 16a and 18a, particularly at the junctures of these pictorial displays, it is necessary to have perfect registration of the marginal areas of these displays. This is because the prior art display 12a utilizes ordinary or plain glass windows 24a, 26a and 28a in its simulated aircraft set-up. This plain glass produces no significant effect on what is seen by the trainee P. Thus, at a juncture 36a of the pair of windows 26a and 28a there is no apparent difficulty in the viewer simultaneously sighting through both the windows 26a and 28a and experiencing visual impressions of both the pictorial displays 16a and 18a exactly as they are. Thus, to the extent that these pictorial displays are not registered with each other and it is easy to detect a discontinuity from one display to the other, the overall realism of the visual display 12a is seriously adversely affected. Thus, for example, it would be necessary in the prior art visual display 12a which attempts to provide a wide viewing angle and thus uses a plurality of pictorial displays 14a, 16a and 18a, to have all horizontally oriented features of terrain which run from one display into an adjacent display appropriately aligned at the juncture of these pictorial displays so that an annoying discontinuity does not manifest itself to the viewer. Additionally, there is a considerable lack of realism in the prior art display 12a of FIG. 3 since the pictorial displays 14a, 16a and 18a, despite even the use of an appropriate reduced scale for the terrain objects, usually fail to give a convincingly realistic impression of being viewed from a considerable distance from the simulated aircraft.

From the foregoing it will be understood that the virtual image lenses 24, 26 and 28 need not be restricted to any one set of parameters, but that different optical designs may be utilized as long as the resulting lens has those optical characteristics which enable it to function in a manner as herein described which, more particularly provides a virtual image of the subject matter being viewed and which also cooperates with an adjacent lens to allow the benefits provided by binocular vision. Good results have been achieved with a virtual image lens having a focal length of 60 inches and an "$f$" number of 2.

A latitude of modification, change and substitution is intended in the foregoing disclosure and in some instances some features of the invention will be employed without a corresponding use of other features. Accordingly, it is appropriate that the appended claims be construed broadly and in a manner consistent with the spirit and scope of the invention herein.

What is claimed is:

1. The combination with a flight simulator including a simulated aircraft having a selected internal vantage point of a visual display circumferentially arranged about said simulated aircraft so as to be viewed from said vantage point throughout a selected comparatively wide viewing angle, said visual display comprising at least three circumferentially arranged left, center and right screens disposed externally of and at a predetermined operative position spaced from the simulated aircraft, said screens being of a composite azimuthal extent corresponding to that of said wide viewing angle, at least three, circumferentially spaced virtual image lenses having an operative position interposed between said vantage point and each of said screens such that images projected on said screens as viewed through said lenses are seen as virtual images at an apparently greater distance than said actual distance of said operative position of said screens from said simulated aircraft, and selected images for projection upon said screens, said images including duplicated subject matter in the portions thereof destined for projection upon the opposite margined edges of said center screen and upon the marginal edges of said right and left screens adjacent said marginal edges of said center screen, whereby said duplicated subject matter as viewed through said lenses is seen in apparent registration with each other.

2. A visual display as defined in claim 1 wherein said screens are disposed with the marginal edges of each adjacent pair in closely adjacent but clearance positions from each other, and said lenses are disposed with the marginal edges of each adjacent pair in actual contact with each other.

References Cited

UNITED STATES PATENTS

| | | | |
|---|---|---|---|
| 2,931,267 | 4/1960 | Hoch | 352—70 X |
| 3,187,339 | 6/1965 | Clay | 352—69 X |
| 3,356,002 | 12/1967 | Raitiere | 352—70 X |

EUGENE R. CAPOZIO, Primary Examiner

P. V. WILLIAMS, Assistant Examiner

U.S. Cl. X.R.
352—70; 353—30